United States Patent [19]
Hirakata et al.

[11] Patent Number: 5,960,752
[45] Date of Patent: Oct. 5, 1999

[54] COMBUSTION CONTROL APPARATUS FOR SPARK IGNITION TYPE 2-CYCLE INTERNAL COMBUSTION ENGINE

[75] Inventors: Yoshiaki Hirakata; Toshihiko Suda; Naohisa Okawada, all of Saitama, Japan

[73] Assignee: Honda Giken Kogyo Kabushiki Kaisha, Tokyo, Japan

[21] Appl. No.: 08/975,113

[22] Filed: Nov. 20, 1997

[30] Foreign Application Priority Data

Nov. 20, 1996 [JP] Japan .................................. 8-309173

[51] Int. Cl.$^6$ ..................................................... F02B 75/02
[52] U.S. Cl. ......................................... 123/65 PE; 60/324
[58] Field of Search .......................... 123/65 PE; 440/89; 60/324

[56] References Cited

U.S. PATENT DOCUMENTS 5,599,253  2/1997  Ishibashi et al. .................... 123/65 PE

FOREIGN PATENT DOCUMENTS

A-7 71279  3/1995  Japan .

*Primary Examiner*—Noah P. Kamen
*Attorney, Agent, or Firm*—Birch, Stewart, Kolasch & Birch, LLP

[57] ABSTRACT

A combustion control apparatus for a spark ignition type 2-cycle internal combustion engine includes fresh air mixed with fuel in a combustion chamber which can be self-ignited at an ignition timing preferable for the operation of the internal combustion engine at least in a low load operation region to effect active thermal atmosphere combustion. When it becomes necessary to stop the internal combustion engine quickly, upon starting of the internal combustion engine again, the starting performance is high. A combustion control apparatus for a spark ignition type 2-cycle internal combustion engine includes fresh air mixed with fuel in a combustion chamber which can be self-ignited at least in a low load operation region. The exhaust path opening adjustment means is driven upon development of a stopping signal for the internal combustion engine, if the internal combustion engine speed is higher than a predetermined speed above idle, so that the exhaust path opening is higher than an opening at which self-ignition is impossible. When the internal combustion engine stopping signal is developed, when the internal combustion engine speed drops until it becomes lower than the predetermined speed, the exhaust path opening adjustment means is driven so that the exhaust path opening is controlled to an opening at which ordinary combustion is possible.

14 Claims, 11 Drawing Sheets

COMBUSTION CONTROL APPARATUS FOR SPARK IGNITION TYPE 2-CYCLE INTERNAL COMBUSTION ENGINE

BACKGROUND OF THE INVENTION

1. Field of the Invention

This invention relates to a combustion control apparatus for a spark ignition type 2-cycle internal combustion engine. Fresh air mixed with fuel mixed with fuel in a combustion chamber can be self-ignited at an ignition timing preferable for the operation of the internal combustion engine at least in a low load operation region to effect active thermal atmosphere combustion. When it is required to stop the internal combustion engine, the combustion control apparatus stops the internal combustion engine quickly. In addition, the combustion control apparatus provides increased starting performance for the internal combustion engine.

2. Description of Background Art

In a spark ignition type 2-cycle internal combustion engine, an exhaust port and a scavenging port opened or closed by a piston are formed on an inner peripheral face of a cylinder bore. Fresh air mixed with fuel prepressurized in a crank chamber is supplied from the scavenging port into a cylinder chamber while combustion gas in the cylinder chamber is exhausted from the exhaust port. The fresh air mixed with fuel compressed in the cylinder chamber is ignited by an ignition plug.

In such a conventional spark ignition type 2-cycle internal combustion engine, if the exhaust port is increased in size to set the output power and the efficiency in a high speed, high load operation region to values higher than high levels, then, in a low load operation region, the amount of unburned hydrocarbons in the exhaust gas is increased by blow-by of fresh air mixed with fuel or unstable combustion. In addition, the fuel consumption is increased.

In order to eliminate this, the present inventors have developed an internal combustion engine including an exhaust control valve which serves as exhaust path opening adjustment means. The exhaust control valve is driven to an exhaust path opening corresponding to an internal combustion engine speed and a throttle valve opening. Therefore, at least in a low load operation region, when an exhaust port is closed by a piston, the cylinder pressure is controlled appropriately to ignite fresh air mixed with fuel in the combustion chamber with the thermal energy of the combustion gas remaining in the combustion chamber. Therefore, the fresh air mixed with fuel in the combustion chamber is self-ignited at an ignition timing preferable for operation of the internal combustion engine. See, Japanese Patent Laid-Open Application No. Heisei 7-71279.

When ignition timing suitable for operation of an internal combustion engine is controlled positively so that active thermal atmosphere combustion occurs, the combustion is hereinafter referred to as AR combustion.

A spark ignition type 2-cycle internal combustion engine which allows AR combustion is illustrated in FIG. 11. In a low load operating region wherein the throttle valve opening θth is restricted, thermal energy included in the combustion gas in a preceding cycle is utilized sufficiently to activate fresh air mixed with fuel in the combustion chamber. The internal combustion engine can operate in a combustion condition near to complete combustion. Therefore, the spark ignition type 2-cycle internal combustion engine exhibits a higher output power than that in an ordinary combustion condition which involves irregular combustion. As a result, where the internal combustion engine is carried on a vehicle or the like, it is disadvantageous. Even if the throttle valve opening θth is restricted, while the internal combustion engine is operating in a high speed, high load operation condition, the effect of the so-called engine brake by a sudden drop of the output power of the internal combustion engine cannot be anticipated sufficiently. The above-mentioned high speed, high load operation condition may occur from attempting to stop the vehicle quickly.

Further, when the internal combustion engine rotates in a reverse direction upon starting or when a kill switch is disconnected to stop the internal combustion engine suddenly, if the internal combustion engine is in an AR combustion state, then it is difficult to quickly stop the internal combustion engine.

SUMMARY AND OBJECTS OF THE INVENTION

The present invention relates to improvements relating to a combustion control apparatus for a spark ignition type 2-cycle internal combustion engine which eliminates the drawbacks described above. A combustion control apparatus for a spark ignition type 2-cycle internal combustion engine is provided wherein fresh air mixed with fuel in a combustion chamber can be self-ignited at least in a low load operation region. The combustion control apparatus includes exhaust path opening adjustment means for adjusting the opening of an exhaust path to control the compression starting cylinder pressure. In addition, control means for driving the exhaust path opening adjustment means to an exhaust path opening corresponding at least to an internal combustion engine speed is provided. A throttle valve opening is provided to control the compression starting cylinder pressure to an aimed compression starting cylinder pressure wherein fresh air mixed with fuel in the combustion chamber can be self-ignited at an ignition timing preferable for operation of the internal combustion engine. The exhaust path opening adjustment means is driven, when, upon development of a stopping signal for the internal combustion engine, the internal combustion engine speed is higher than a predetermined speed higher than an idling speed. Therefore, the exhaust path opening may be higher than an opening at which self-ignition is impossible. In the case when the internal combustion engine stopping signal is developed, when the internal combustion engine speed drops until it becomes lower than the predetermined speed or is lower than the predetermined speed, the exhaust path opening adjustment means is driven so that the exhaust path opening may be controlled to an opening wherein ordinary combustion is possible. The active thermal atmosphere combustion speed is hereinafter referred to as AR combustion speed.

Since the present invention is constructed as described above, when a signal for stopping the internal combustion engine is developed, if the internal combustion speed is higher than the predetermined speed higher than the idling speed, then the exhaust path opening adjustment means is driven so that the exhaust path opening becomes higher than the opening at which self-ignition is impossible. In addition, an AR combustion operation condition having high output power is bypassed or the AR combustion operation condition is cancelled. Consequently, the output power of the internal combustion engine drops remarkably to allow for quick stopping of the internal combustion engine.

Further, in the present embodiment, in the case when a signal for stopping the internal combustion engine is developed, when the speed of the internal combustion engine drops until it becomes lower than the required speed or is lower than the predetermined speed, the exhaust path opening adjustment means is driven so that the exhaust path opening is controlled to an opening at which ordinary combustion is possible. Also, when the internal combustion engine is started again after the internal combustion engine is stopped, the starting performance is maintained at a high level.

In this manner, in the present invention, when it is required to stop the internal combustion engine suddenly, the internal combustion engine can be stopped suddenly. Furthermore, once the internal combustion engine is stopped, the internal combustion engine can be readily started.

Further, upon sudden stopping of the internal combustion engine, the present invention permits a high output power and prevents active thermal atmosphere combustion with a higher degree of certainty.

Further scope of applicability of the present invention will become apparent from the detailed description given hereinafter. However, it should be understood that the detailed description and specific examples, while indicating preferred embodiments of the invention, are given by way of illustn only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustn only, and thus are not limitative of the present invention, and wherein.

DETAILED DESCRIPTION OF THE PREFERRED EMBODIMENTS

Figure 1:
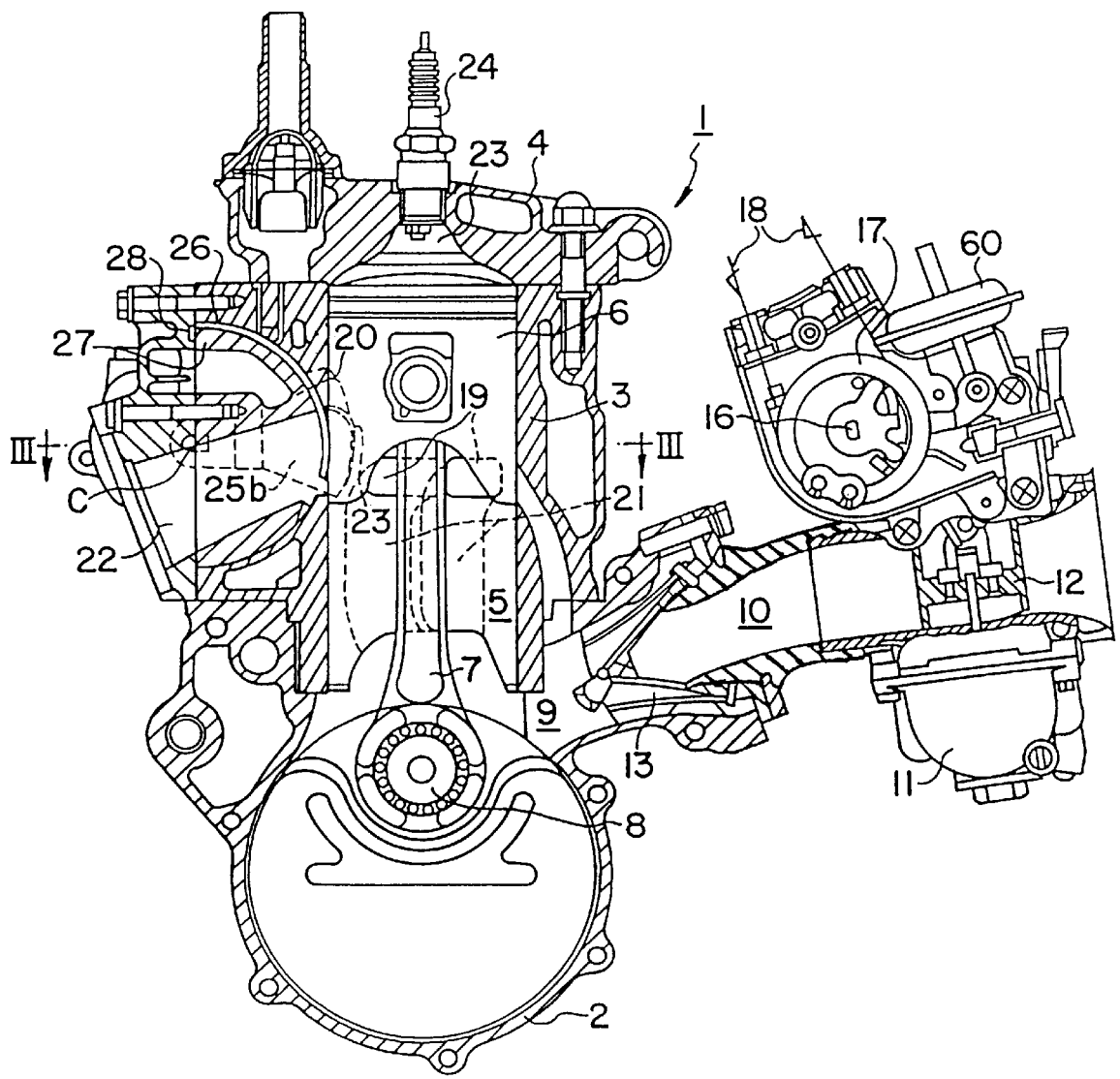
FIG. 1 is a vertical sectional side elevational view taken along a cylinder portion of a spark ignition type 2-cycle internal combustion engine 1 which includes a combustion control apparatus of the present invention.

In the following, an embodiment of the present invention shown in FIGS. 1 to 9 is described. A spark ignition type 2-cycle internal combustion engine 1 which includes a combustion control apparatus of the present invention is carried on a motorcycle not shown. In the spark ignition type 2-cycle internal combustion engine 1, a cylinder block 3 and a cylinder head 4 are placed one on the other on and integrally coupled to a crankcase 2.

A piston 6 is fitted for upward and downward sliding movement in a cylinder bore 5 formed in the cylinder block 3. The piston 6 and a crank 8 are connected to each other by a connecting rod 7 so that the crank 8 is driven to rotate as the piston 6 moves upwardly and downwardly.

Figure 6:
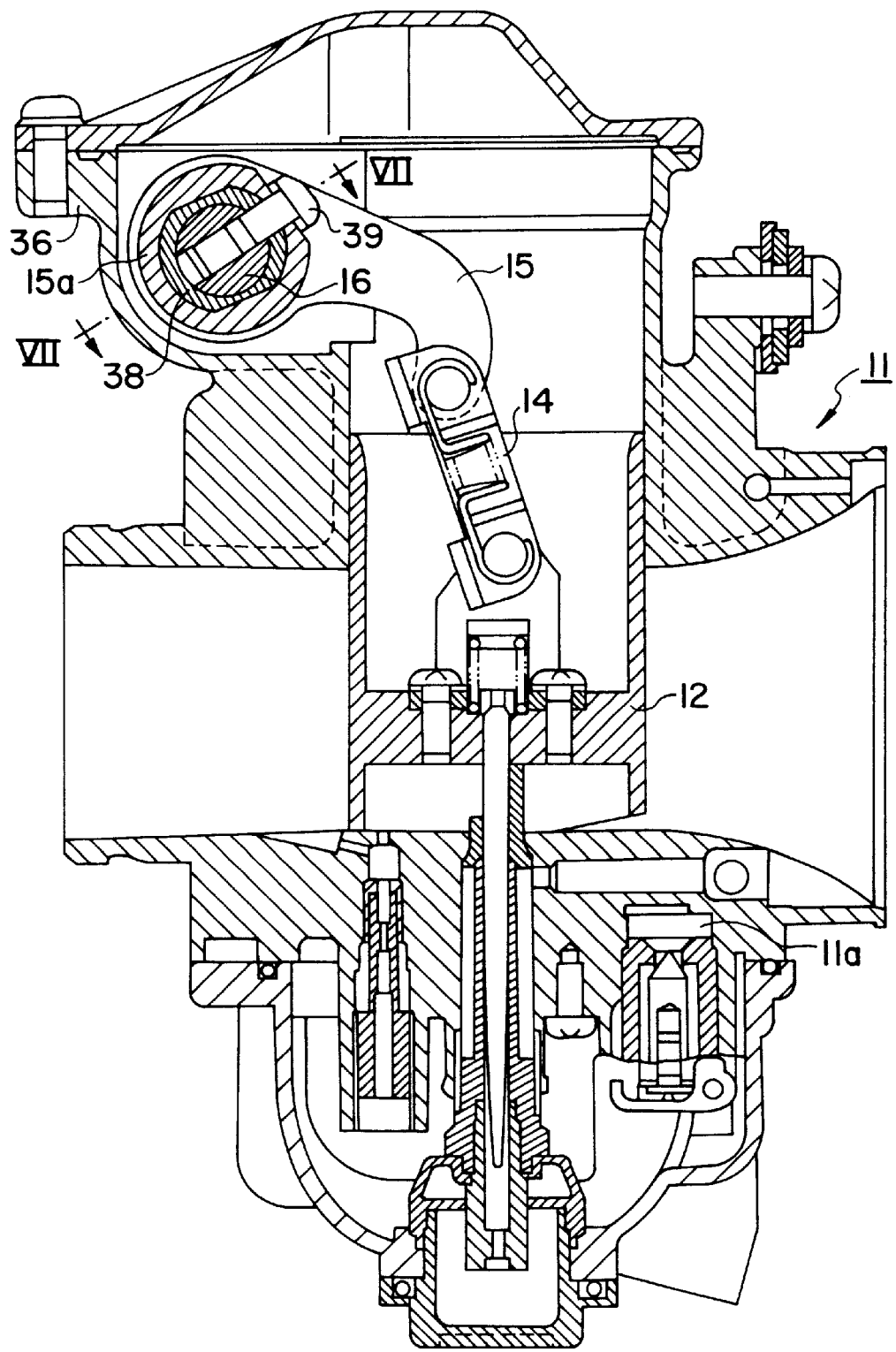
FIG. 6 is a vertical sectional side elevational view of FIG. 5.

Further, an intake path 10 is connected to a crank chamber 9 in the crankcase 2, and a carburetor 11 and a reed valve 13 are interposed in series in the intake path 10. As shown in FIG. 6, a throttle valve 12 of the carburetor 11 is connected to a throttle shaft 16 via a rod 14 and a link arm 15. The throttle shaft 16 is connected to a throttle drum 17 via a throttle adjustment mechanism 35 which will be hereinafter described. The throttle drum 17 is connected to a throttle grip not shown by a wire 18 so that, if the throttle grip is turned in an accelerating direction, then the throttle drum 17 is rotated in the counter-clockwise direction to lift the throttle valve 12 to increase the throttle valve opening.

Furthermore, the intake path 10 is connected to the crank chamber 9 of the crankcase 2, and a scavenging port 19 and an exhaust port 20 are open to an inner peripheral face of the cylinder bore 5. The scavenging port 19 is communicated with the crank chamber 9 by a scavenging path 21 and the exhaust port 20 is communicated with an exhaust path 22.

Meanwhile, an ignition or spark plug 24 is provided in a combustion chamber 23 at an upper portion of the cylinder bore 5. Fresh air mixed with fuel mixed with fuel which is supplied from the carburetor 11 is taken into the crank chamber 9. The crank chamber 9 is subjected to negative pressure by an upward stroke, via the reed valve 13, and compressed in a downward stroke. When the piston 6 moves down until the scavenging port 19 is opened, the compressed fresh air mixed with fuel is supplied from the scavenging port 19 into the combustion chamber 23. As a result of admission of the compressed fresh air mixed with fuel, part of the combustion gas in the combustion chamber 23 is discharged from the exhaust port 20 to the exhaust path 22. When the scavenging port 19 is closed and the exhaust port 20 is closed by upward movement of the piston 6, the fuel air mixture in the combustion chamber 23 is compressed as a result of the upward movement of the piston 6. When the piston is in the proximity of the top dead center, ignition by the ignition plug 24 or self-ignition by thermal energy of remaining gas of the preceding cycle is performed.

Figure 2:
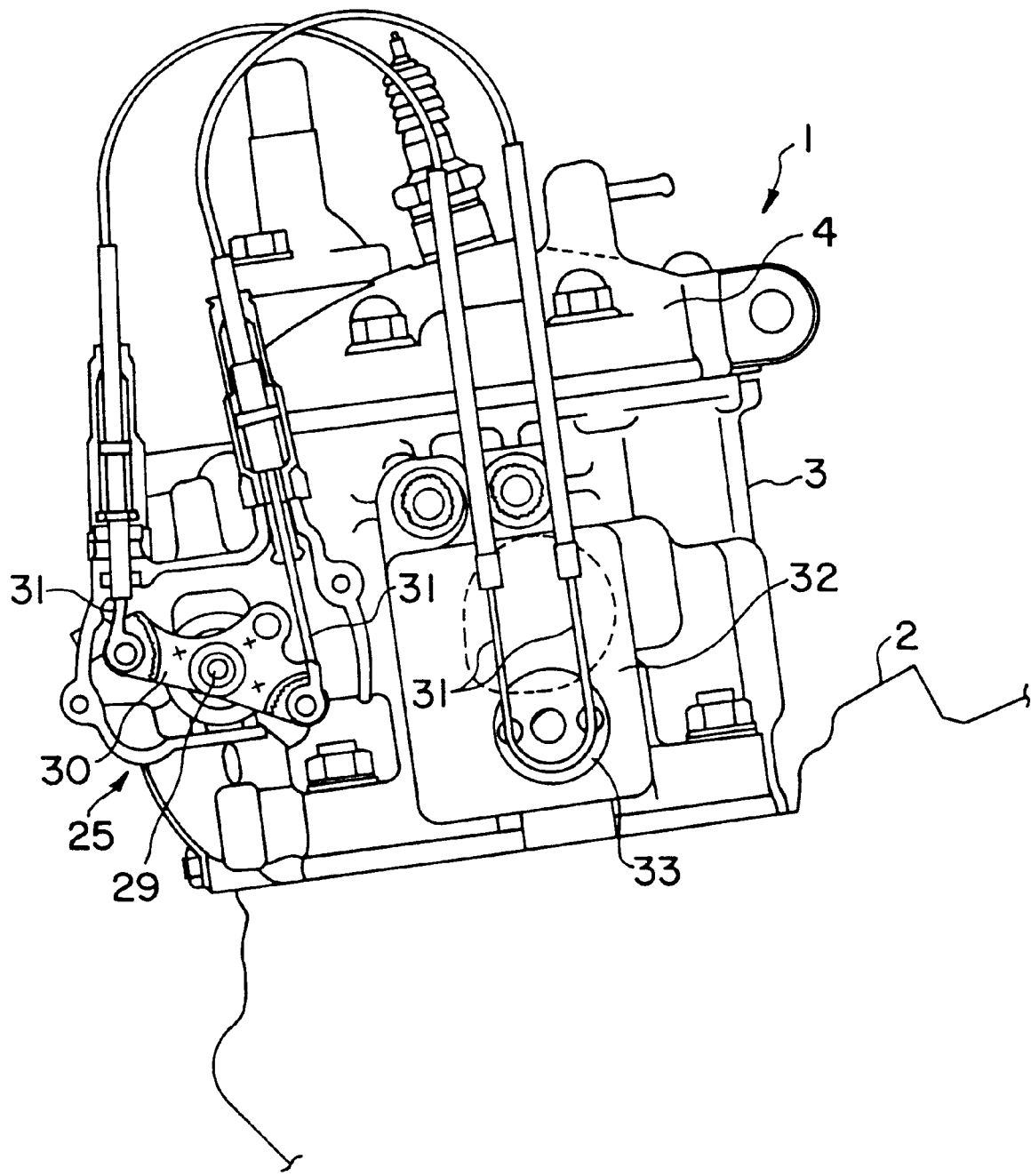
FIG. 2 is a side elevational view of the cylinder portion showing a side face of the internal combustion engine illustrated in FIG. 1.
Figure 3:
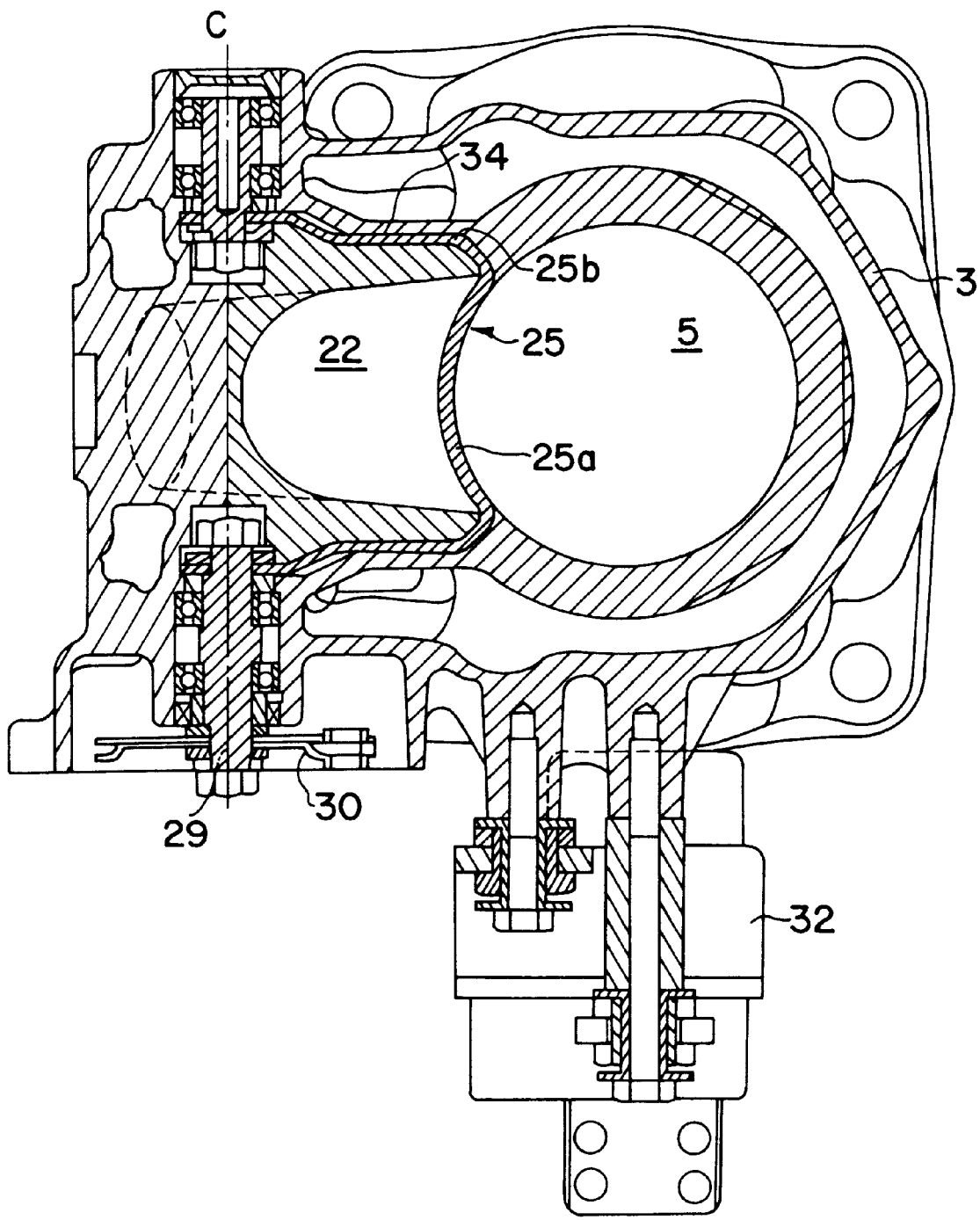
FIG. 3 is a horizontal sectional plan view taken along line III—III of FIG. 1.

Further, near the exhaust port 20, an exhaust control valve 25 is provided which serves as an exhaust path opening adjustment means. The exhaust control valve 25 is fitted in a gap 28 formed by a recess 26 provided in the cylinder block 3. The recess has an arcuate vertical sectional shape. Furthermore, an exhaust path member 27 is formed in an arcuate vertical sectional shape substantially the same as that of the recess 26. The gap 28 has a substantially uniform gap width. The exhaust control value 25 is supported for upward and downward rocking motion around a center line C. A driving lever 30 shown in FIG. 2 is integrally fitted on a drive shaft 29 integral with the exhaust control valve 25. The driving lever 30 is connected to a pulley 33 of an exhaust control servo motor 32 by a driving cable 31. Consequently, the exhaust control valve 25 is driven to rock upwardly and downwardly by the exhaust control servo motor 32 so that a required exhaust path opening θe between 0% or several percent to 100% may be set.

In addition, the horizontal transverse section of the exhaust control valve 25 has a channel-like shape. The a side face arm portion 25b of the exhaust control valve 25 is fitted in a gap portion 34 positioned outwardly of the exhaust path 22 so that the side face arm portion 25b, except for the arcuate portion 25a of the exhaust control valve 25 which closes the exhaust port 20, does not improperly influence the flow of exhaust gas.

Figure 7:
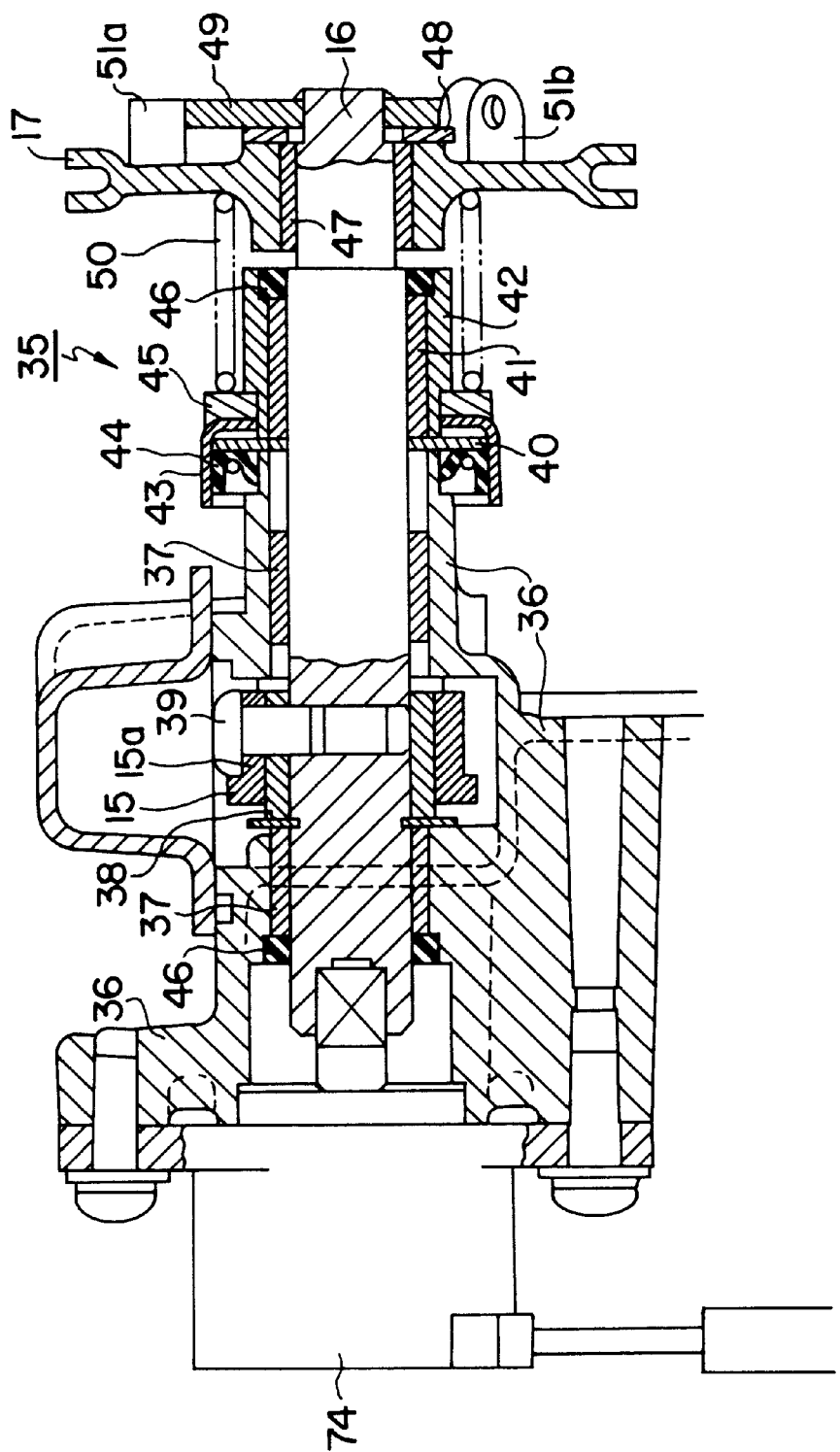
FIG. 7 is a vertical sectional view taken along line VII—VII of FIG. 6.
Figure 8:
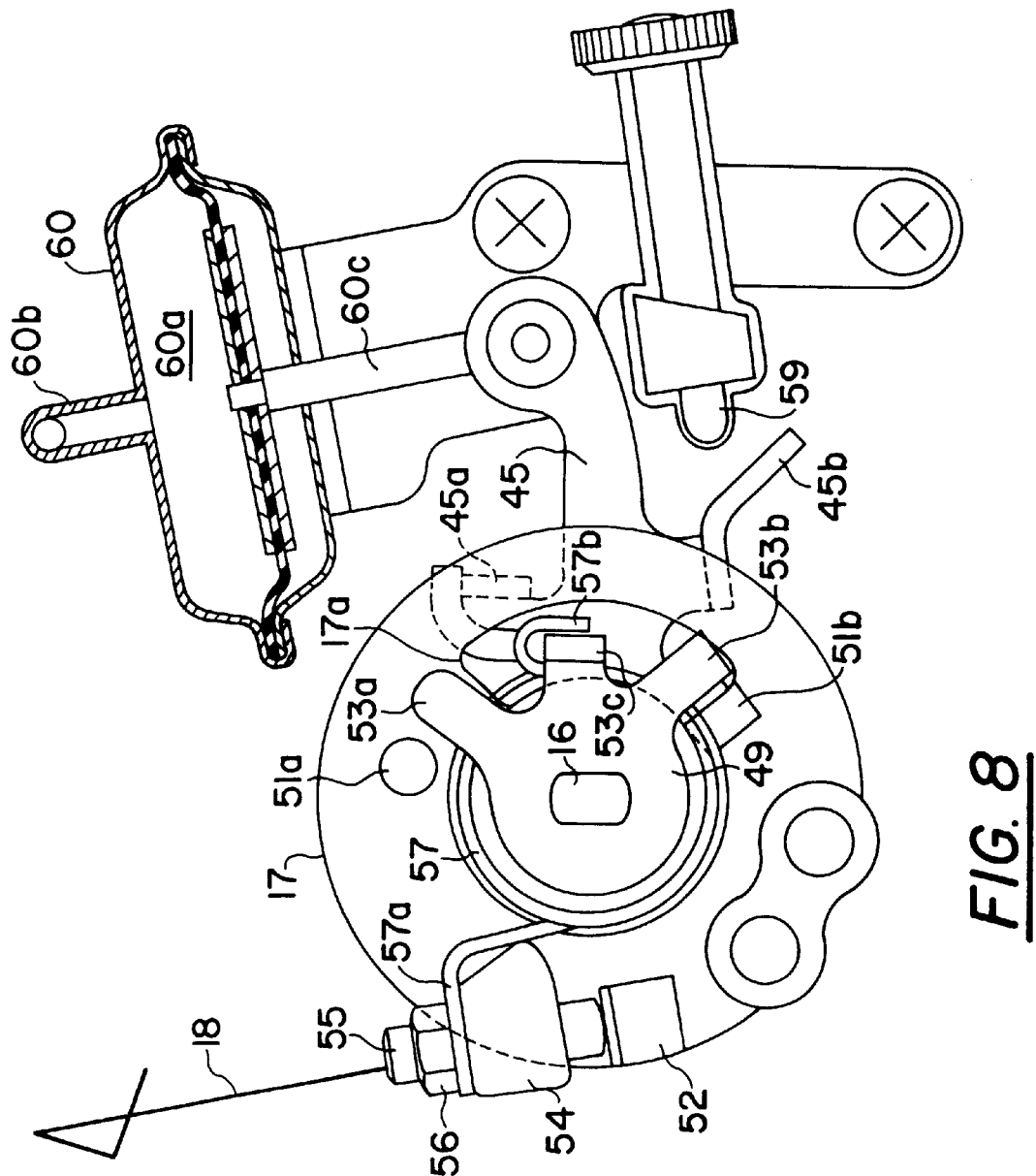
FIG. 8 is a vertical sectional side elevational view in a condition wherein atmospheric air pressure is introduced into a diaphragm chamber of an idling opening setting diaphragm.
Figure 9:
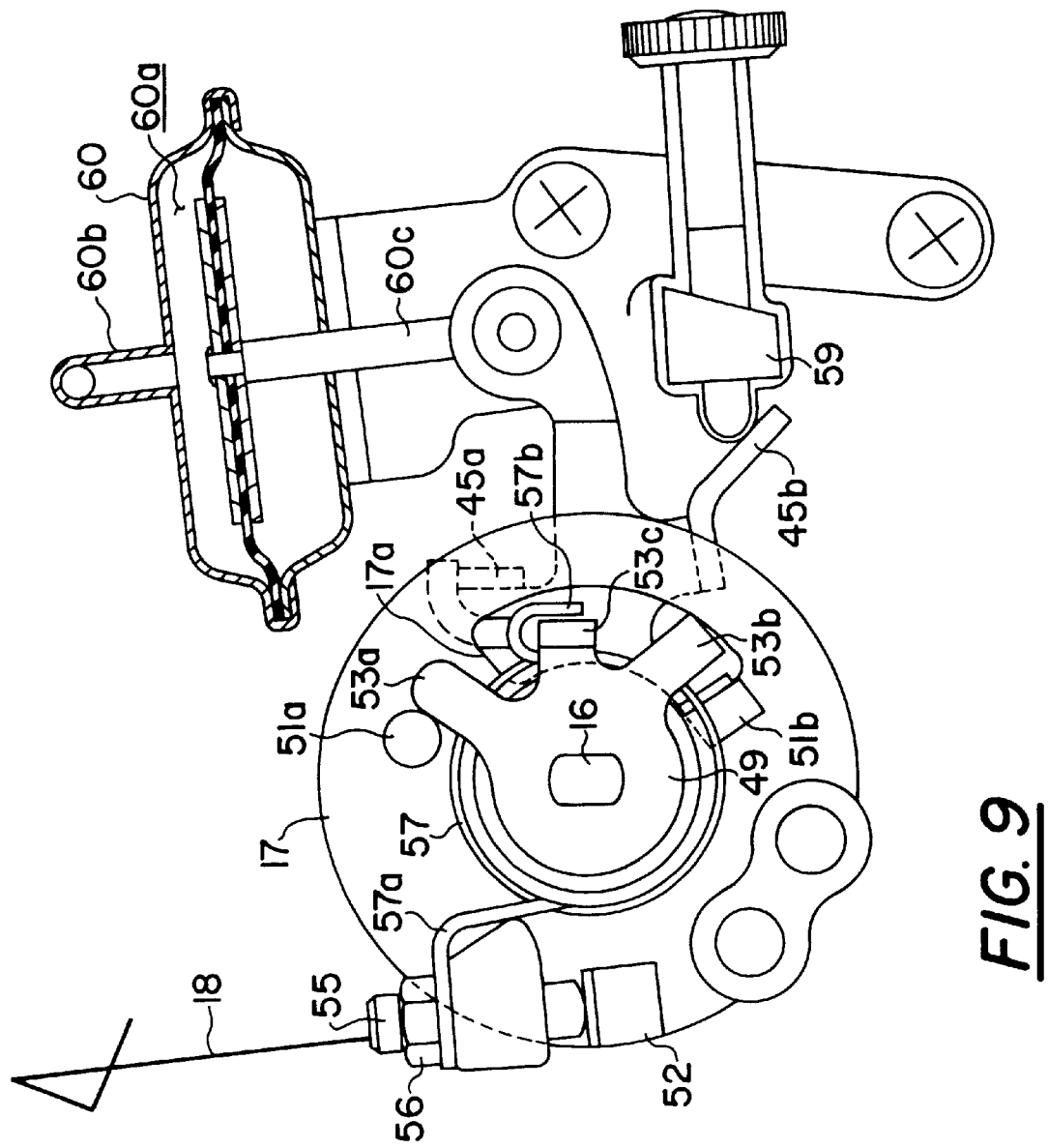
FIG. 9 is a vertical sectional side elevational view in a condition wherein an intake negative pressure is introduced into the diaphragm chamber of the idling opening setting diaphragm.

The throttle adjustment mechanism 35 interposed between the link arm 15 integral with the throttle shaft 16 and the throttle drum 17 is constructed as shown in FIGS. 7 to 9.

First, the throttle shaft 16 is supported for rotation on a carburetor operation section body 36 by a pair of bearings 37 (at the left end and the center in the figures) over an axial direction. A sleeve 38 is fitted at a substantially central portion of the throttle shaft 16 while a base end tubular portion 15a of the link arm 15 is fitted around an outer periphery of the sleeve 38 as shown in FIGS. 6 and 7. A bolt 39, extending through the base end tubular portion 15a of the link arm 15 and the sleeve 38, is screwed on the throttle shaft 16, and the link arm 15 is coupled integrally to the throttle shaft 16.

Meanwhile, a thrust receiving washer 40 is abutted with the left end (right end in FIG. 7) of the carburetor operation section body 36. The thrust receiving washer 40 is fitted on the throttle shaft 16, and a sleeve 42 is fitted leftwardly (rightwardly in FIG. 7) of the thrust receiving washer 40 for rotation on the throttle shaft 16 with a bearing 41 interposed therebetween. An oil seal housing 43 and an idling control lever 45 are coupled integrally on the sleeve 42 and an oil seal 44 is interposed between the carburetor operation section body 36 and the thrust receiving washer 40 in the oil seal housing 43. A pair of oil seals 46 are provided at the opposite ends of the throttle shaft 16 such that the throttle shaft 16 is sealed in the carburetor operation section body 36 and the sleeve 42 by the oil seals 46.

The throttle drum 17 is fitted for rotation at a left portion (right portion in FIG. 7) of the throttle shaft 16 with a bearing 47 interposed therebetween. A thrust receiving washer 48 is abutted leftwardly (rightwardly in FIG. 7) of the throttle drum 17. A throttle lever 49 is integrally fitted to the left end of the throttle shaft 16, and a throttle return spring 50 is interposed between the idling control lever 45 and the throttle drum 17 on an outer periphery of the sleeve 42.

Furthermore, a pair of stopper bosses 51a and 51b and a deceleration opening stopper 52 are provided and project on a left side face (right side face in FIG. 7) of the throttle drum 17. A pair of engaging pieces 53a and 53b are provided on the throttle lever 49 such that the throttle lever 49 may be rocked within a range of a small angle with respect to the throttle drum 17 until it is engaged with the stopper boss 51a and the stopper boss 51b. A further engaging piece 53c is provided on the throttle lever 49. The engaging piece 53c extends towards the idling control lever 45 through a window 17a of the throttle drum 17 until it is engaged with a lug 45a of the idling control lever 45.

Further, as shown in FIGS. 8 and 9, a deceleration opening screw 55 is inserted and screwed in a receiving piece 54 integral with the carburetor operation section body 36. A lock nut 56 is screwed in the deceleration opening screw 55. One end 57a of a lever return spring 57 is anchored at the receiving piece 54. The other end 57b of the lever return spring 57 is anchored at the engaging piece 53c of the throttle lever 49. Consequently, by the spring force of the lever return spring 57, the throttle lever 49 is biased in a throttle returning direction, that is, in the clockwise direction in FIGS. 8 and 9. The engaging piece 53b of the throttle lever 49 is engaged with the stopper boss 51b of the throttle drum 17 so that the throttle drum 17 is biased in the same direction. Consequently, the deceleration opening stopper 52 provided on the throttle drum 17 is arrested by an end of the deceleration opening screw 55.

Further, the idling control lever 45 extends in the rearward direction of the vehicle (in the rightward direction in FIGS. 8 and 9) and is connected at an end thereof to a lower end of a connection member 60c of an idling opening setting diaphragm 60 (a horizontal direction displacement of the connection portion from the connection member 60c caused by rocking motion of the idling control lever 45 is absorbed by a mechanism not shown). A lower engaging piece 45b of the idling control lever 45 is engaged with an end of a stop screw 59 provided on a body of the idling opening setting diaphragm 60.

Figure 4:
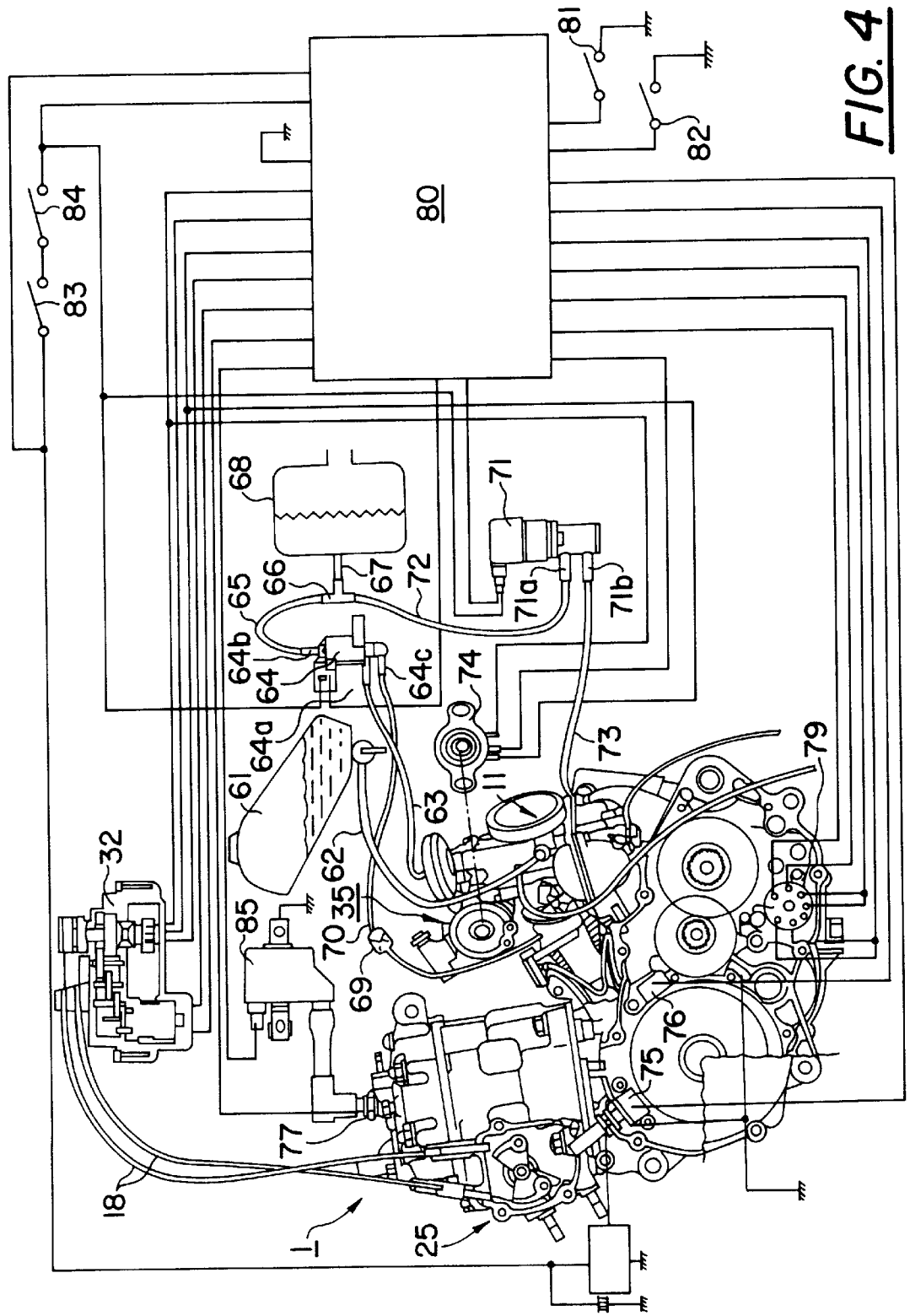
FIG. 4 is a view of an entire control system of the embodiment shown in FIG. 1.
Figure 5:
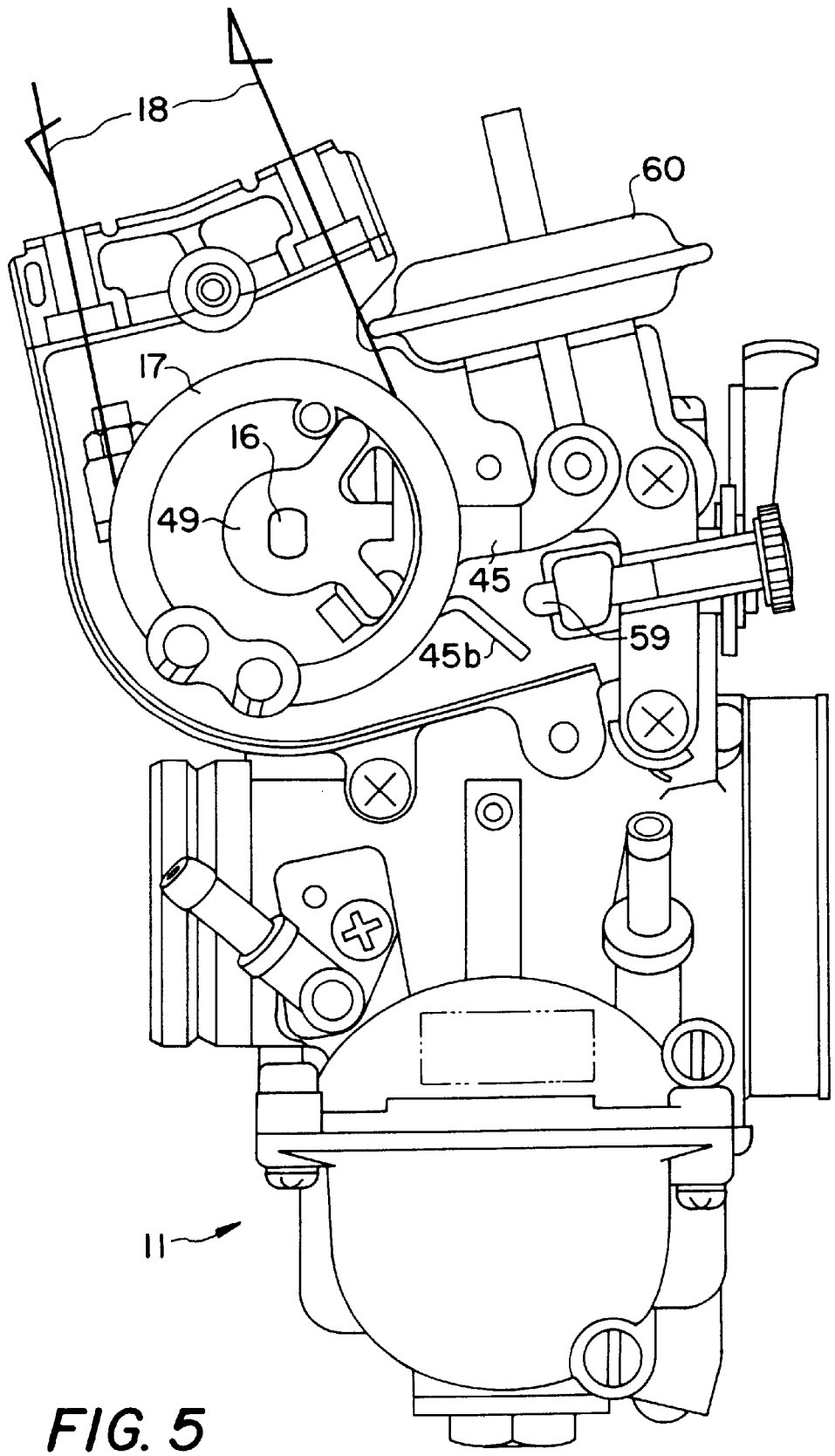
FIG. 5 is an enlarged side elevational view of a throttle valve of FIG. 1.

Referring to FIG. 4 which illustrates essential parts of the spark ignition type 2-cycle internal combustion engine 1, a fuel tank 61 is connected to a fuel reception chamber 11a (refer to FIG. 6) of the carburetor 11 by a fuel supply tube 62. A tube 63 is connected at an end thereof to a pipe 60b which is open to a diaphragm chamber 60a of the idling opening setting diaphragm 60 and is connected at the other end thereof to an outputting portion 64a of an idling solenoid 64. An inputting portion 64b of the idling solenoid 64 is connected to an air cleaner 68 via a tube 65, a coupling 66 and another tube 67. Another inputting portion 64c of the idling solenoid 64 is connected to an end of a tube 70 in which a check valve 69 is interposed. The other end of the tube 70 is connected to the intake path 10. In an inoperative condition of the idling solenoid 64, the diaphragm chamber 60a of the idling opening setting diaphragm 60 is in communication with the air cleaner 68 so that atmospheric air pressure is introduced into the air cleaner 68. However, in an operative condition of the idling solenoid 64, the diaphragm chamber 60a is in communication with the intake path 10 so that negative pressure is introduced into the air cleaner 68.

In addition, an inputting portion 71a of a slow jet control solenoid 71 is connected to the air cleaner 68 via a tube 72, the coupling 66 and the tube 67. An outputting portion 71b of the slow jet control solenoid 71 is connected to a slow jet portion of the carburetor 11 via a tube 73. Thus, in an inoperative condition of the slow jet control solenoid 71, air is not introduced into the slow jetting portion of the carburetor 11, and fuel is not supplied into the intake path 10 from the slow jet portion of the carburetor 11. On the contrary, in an operative condition, air is introduced into the slow jet portion of the carburetor 11 and fuel is supplied into the intake path 10 from the slow jet portion of the carburetor 11.

Further, as shown in FIG. 7, a throttle opening sensor 74 formed from a potentiometer or the like is directly coupled to the throttle shaft 16 so that a throttle valve opening θth of the throttle valve 12 is inputted to an electronic control unit 80 from the throttle opening sensor 74.

Furthermore, two pursers 75 and 76 spaced from each other by a predetermined angle in a circumferential direction are disposed sidewardly in the neighborhood of the crank 8. An internal combustion engine speed Ne and a reverse rotation are detected by the pulsers 75 and 76 and inputted to the electronic control unit 80.

A water temperature gage 77 for detecting the water temperature of cooling water which flows into the spark ignition type 2-cycle internal combustion engine 1 and a shift drum 78 of a gear transmission, not shown, are additionally provided. A shift position sensor 79 for detecting the neutral, first speed, second and third speed, fourth speed, and fifth and sixth speed positions of the transmission is provided. Detection signals of the water temperature gage 77 and the shift position sensor 79 are inputted to the electronic control unit 80.

Further, a clutch switch 81 exhibits an off state when a clutch, not shown, is in a connected condition but exhibits an on state when the clutch is in a disconnected condition. A side stand switch 82 exhibits an off state when a side stand, not shown, is in an erected condition but exhibits an on state when the side stand is in a fallen condition. A combination switch 83 is switched on when a key not shown is inserted and operated. A kill switch 84 is provided for a steering handle bar not shown and exhibits an on state when the steering handle bar is not in an operated condition is provided. The above-mentioned switches are connected to the electronic control unit 80 as shown in FIG. 4.

Next, the electronic control unit 80 delivers a control signal to the exhaust control servo motor 32 so that the exhaust path opening θe may be lower than a predetermined value when the internal combustion engine speed Ne detected by the pulsers 75 and. 76 is higher than 2,500 rpm and the throttle valve opening θth detected by the throttle opening sensor 74 is within the range of 8 to 20% while the air fuel is 13 to 15. Consequently, under those conditions, the spark ignition type 2-cycle internal combustion engine 1 is controlled to an AR combustion condition.

Figure 10:
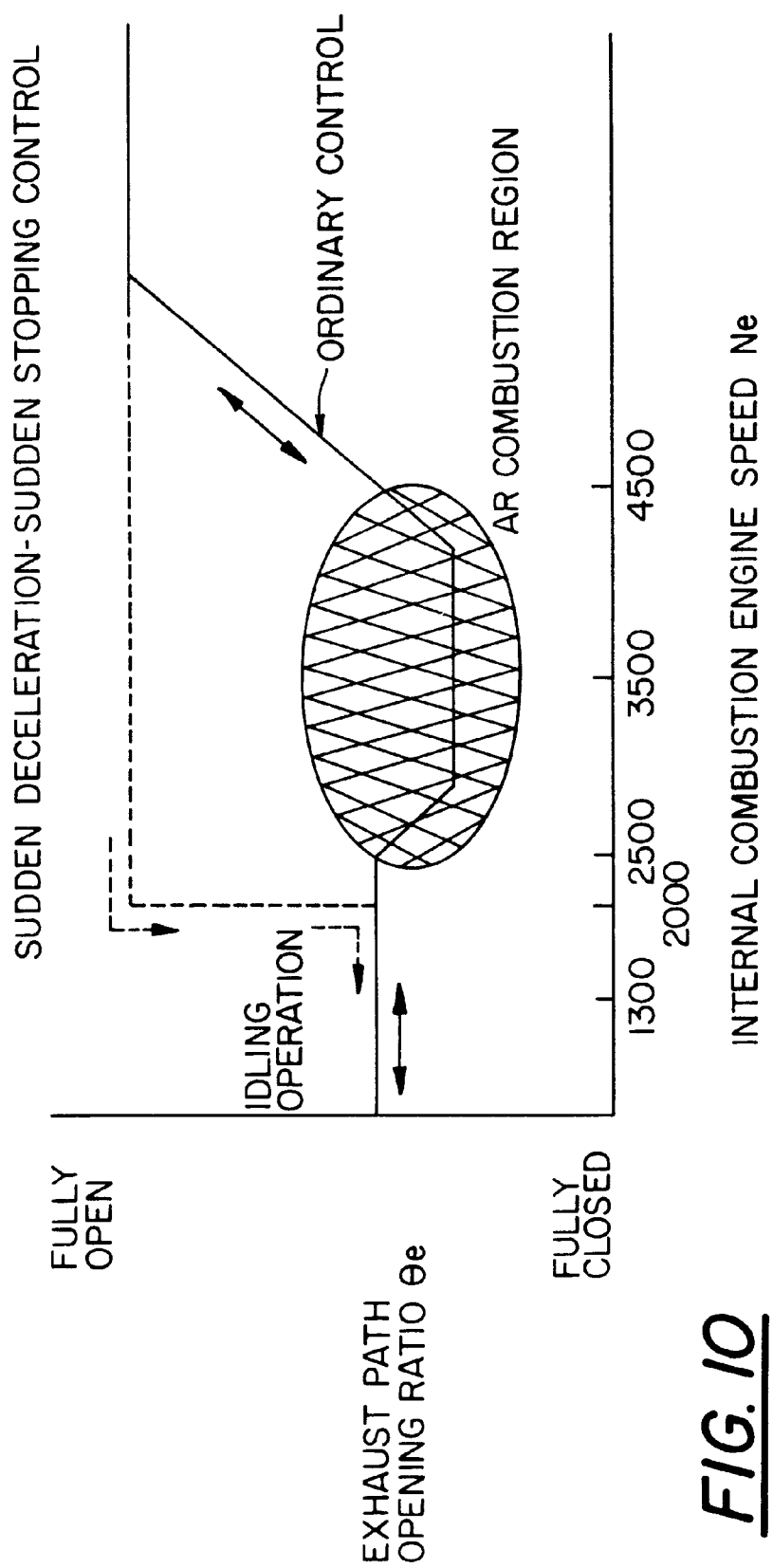
FIG. 10 is a characteristic diagram illustrating a relationship between the internal combustion engine speed and the exhaust path opening of the embodiment of the present invention.
Figure 11:
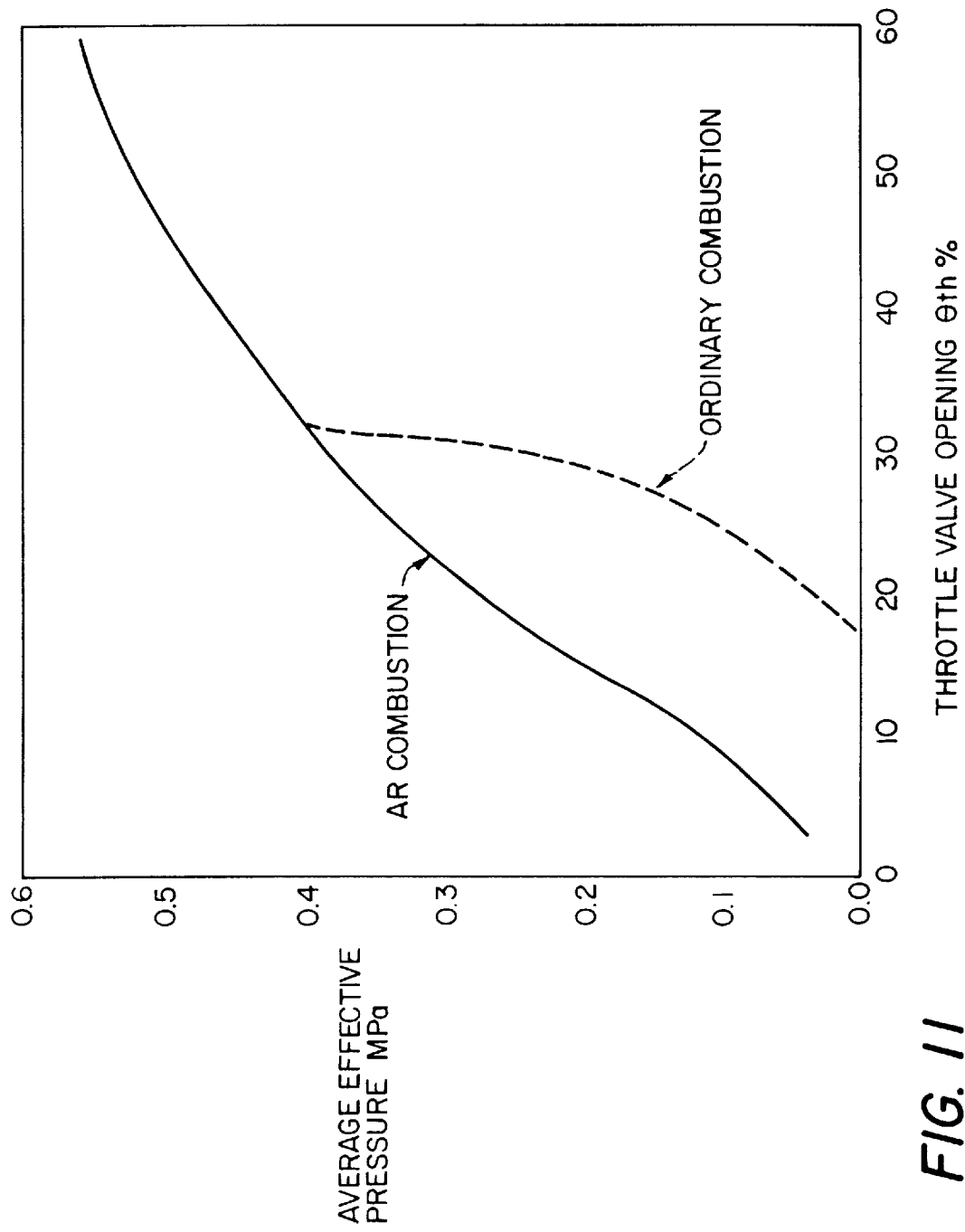
FIG. 11 is a characteristic diagram illustrating variations of an average effective pressure in an ordinary combustion condition and an AR combustion condition when a throttle valve in a spark ignition type 2-cycle internal combustion engine is varied.

Then, the AR combustion condition is maintained while the internal combustion engine speed Ne remains within a range having a center value substantially at 3,500 rpm and ranging 2,500 rpm to 4,500 rpm as shown in FIG. 10.

On the other hand, if the internal combustion engine speed Ne is higher than an idling speed (1,300 rpm) and 1. the combination switch 83 or the kill switch 84 is switched off in a condition wherein the combination switch 83 and the kill switch 84 are on and spark ignition type 2-cycle internal combustion engine 1 is operating,
2. a condition wherein the spark ignition type 2-cycle internal combustion engine 1 rotating in a reverse direction is detected from signals of the pulsers 75 and 76, or
3. it is detected by the side stand switch 82 that the side stand is erected in a condition wherein the gear transmission is set to a speed position other than the neutral position, a driver will return the throttle grip to its original stopping position. In this instance, no control signal is developed from the electronic control unit 80, and the idling solenoid 64 is in an inoperative condition. Consequently, atmospheric pressure is introduced into the diaphragm chamber 60a of the idling opening setting diaphragm 60 so that the idling control lever 45 is pushed down and the throttle lever 49 and the link arm 15 are rotated in the clockwise direction in FIGS. 8 and 9 via the lug 45a of the idling control lever 45 and the engaging piece 53c. Consequently, the throttle valve 12 is restricted to a condition close to a substantially fully closed condition and the spark ignition type 2-cycle internal combustion engine 1 is decelerated suddenly.

If the internal combustion engine speed Ne becomes lower than 2,000 rpm, then the idling solenoid 64 is put into an operative condition by a control signal from the electronic control unit 80. Consequently, an intake negative pressure of the intake path 10 is introduced into the diaphragm chamber 60a of the idling opening setting diaphragm 60, and the idling control lever 45 is pulled upwardly. Thereupon, the throttle lever 49 and the link arm 15 are pivoted in the counterclockwise direction so that the throttle valve opening θth of the throttle valve 12 is increased slightly such degree that idling is possible. In addition, the exhaust control servo motor 32 is rendered operative by a PWM (pulse width adjustment) control signal from the electronic control unit 80 so that the exhaust control valve 25 is opened to an ordinary exhaust path opening θe.

On the other hand, if the exhaust control valve 25 comes into a disabled condition, then the electronic control unit 80 does not supply current to the exhaust control servo motor 32 so that the exhaust control servo motor 32 is stopped.

Further, when the gear transmission is set to the neutral position while the side stand is erected and no detection signal is developed from the side stand switch 82, the throttle valve 12 is set to a throttle valve opening θth of such a degree that idling is possible while the exhaust control valve 25 is set to a high exhaust opening oe so that idling is possible.

Furthermore, in the electronic control unit 80, when the water temperature detected by the water temperature gage 77 is lower than 60° C., a control signal is not delivered to the slow jet control solenoid 71 and a slow air jet, not shown, remains in an inoperative condition. However, if the detected water temperature of the water temperature gage 77 becomes higher than 60° C., then a control signal is delivered to the slow jet control solenoid 71 so that the slow air jet, not shown, is rendered operative and control of the requested air fuel of AR combustion is performed. Consequently, the driving stability of on-road and off-road compatibility and improvement in fuel consumption are allowed.

In addition, if the clutch, not shown, is disconnected and the clutch switch 81 is turned on, then a map for exclusive use is selected. In a no load operation of the internal combustion engine, AR combustion control is not performed.

Since the embodiment shown in the drawings is constructed in such a manner as described above, in a stopping condition of the spark ignition type 2-cycle internal combustion engine 1, the exhaust control valve 25 is restricted to a comparative low exhaust path opening θe of such a degree that idling operation is possible. Then, in a cranking condition of a starting open, since the exhaust control valve 25 is kept to this exhaust opening θe, compression of fuel air mixture in the combustion chamber 23 is performed appropriately. Further, since intake air negative pressure is introduced into the diaphragm chamber 60a and the throttle valve 12 is opened a little, supply of fresh air mixed with fuel is performed. Consequently, the startability is improved.

After starting the spark ignition type 2-cycle internal combustion engine 1, if the throttle grip is operated in an opening direction to increase the internal combustion engine speed Ne, then an AR combustion region is entered as shown in FIG. 10 and the exhaust path opening θe of the exhaust control valve 25 is slightly further restricted. Consequently, AR combustion is allowed, and the spark ignition type 2-cycle internal combustion engine 1 can be operated stably and the fuel cost is maintained at a high level.

Further, as the internal combustion engine speed Ne increases, as shown in FIG. 10, it comes out of the AR combustion region and the exhaust path opening θe of the exhaust control valve 25 increases in a corresponding relationship. Consequently, the spark ignition type 2-cycle internal combustion engine 1 can operate in an ordinary combustion condition.

Furthermore, if, in a high speed operation condition, it becomes necessary to decelerate or stop the spark ignition type 2-cycle internal combustion engine 1 urgently in such a case as 1., 2, or 3. as described hereinabove, as indicated by a dotted line in FIG. 10, the throttle valve 12 is restricted to a fully closed condition while the exhaust path opening θe of the exhaust control valve 25 is kept in a condition near to a fully open condition. When the internal combustion engine speed Ne drops to 2,000 rpm, the exhaust control servo motor 32 is rendered operative to restrict the exhaust control valve 25 and an intake air negative pressure is introduced into the diaphragm chamber 60a of the idling opening setting diaphragm 60 so that the throttle valve 12 is slightly opened. Consequently, the spark ignition type 2-cycle internal combustion engine 1 enters an idling operation allowing condition.

If the spark ignition type 2-cycle internal combustion engine 1 is stopped, then the exhaust control valve 25 is restricted and the exhaust path opening θe is set to a low value of such a degree that idling operation is possible, a condition wherein a high starting performance can be maintained.

In this manner, when it is desired to rapidly decelerate or stop the spark ignition type 2-cycle internal combustion engine 1 in a condition wherein the spark ignition type 2-cycle internal combustion engine 1 is being operated in a high speed rotation region, since the exhaust control servo motor 32 is controlled to set the exhaust control valve 25 to a fully open condition so that the AR combustion region may be bypassed, it is easy to decelerate or stop the spark ignition type 2-cycle internal combustion engine 1 suddenly. In addition, the starting performance can be maintained at a high level. In the case of sudden deceleration, idling operation can also be performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combustion control apparatus for a spark ignition type 2-cycle internal combustion engine wherein fresh air mixed with fuel in a combustion chamber can be self-ignited at least in a low load operation region, comprising:

exhaust path opening adjustment means for adjusting the opening of an exhaust path to control the compression starting cylinder pressure;

control means for driving said exhaust path opening adjustment means to an exhaust path opening corresponding at least to a first predetermined engine speed and a predetermined throttle valve opening to control the compression starting cylinder pressure so that fresh air mixed with fuel in said combustion chamber can be self-ignited at an ignition timing sufficient for operation of said internal combustion engine;

wherein said control means drives said exhaust path opening adjustment means upon development of a stopping signal for said internal combustion engine, when the internal combustion engine speed is higher than a second predetermined speed above idle, to open said exhaust path opening to a position where self-ignition is impossible; and when the internal combustion engine speed drops below said first predetermined speed, said control means drives said exhaust path opening adjustment means to close the exhaust path opening to an opening of ordinary combustion.

2. The combustion control apparatus for a spark ignition type 2-cycle internal combustion engine according to claim 1, wherein the predetermined speed is within an active thermal atmosphere combustion speed region.

3. The combustion control apparatus for a spark ignition type 2-cycle internal combustion engine according to claim 1, wherein the exhaust path opening adjustment means includes an exhaust control valve mounted within a gap formed by a recess in a cylinder block of the internal combustion engine, the recess having an arcuate vertical sectional shape.

4. The combustion control apparatus for a spark ignition type 2-cycle internal combustion engine according to claim 3, and further including an exhaust path member formed in an arcuate vertical sectional shape, said exhaust path member forming a side of the recess and a portion of the exhaust path, said exhaust control valve is mounted for upward and downward rotation about an axis in said internal combustion engine.

5. The combustion control apparatus for a spark ignition type 2-cycle internal combustion engine according to claim 4, and further including a driving lever operatively mounted to said exhaust control valve and an exhaust control servo motor for rotatively positioning said driving lever to rotate said exhaust control valve.

6. The combustion control apparatus for a spark ignition type 2-cycle internal combustion engine according to claim 1, and further including a throttle valve adjustment mechanism including a throttle shaft and a throttle drum, a throttle lever is affixed to the throttle shaft and a throttle return spring is operatively positioned for biasing said throttle shaft.

7. The combustion control apparatus for a spark ignition type 2-cycle internal combustion engine according to claim 6, and further including a pair of stopper bosses and a deceleration opening stopper for engaging said throttle lever to limit the range of rotation of the throttle drum.

8. The combustion control apparatus according to claim 1, wherein when the internal combustion engine speed is higher than the second predetermined speed, the control means controls the throttle valve opening to a fully closed position and the exhaust path opening to a fully open position.

9. The combustion control apparatus according to claim 8, wherein when the internal combustion engine speed drops below the first predetermined speed, the control means controls the exhaust path opening to be restricted and the throttle valve opening to be slightly open.

10. The combustion control apparatus according to claim 1, wherein said speed above said second predetermined speed is above an active thermal atmosphere combustion speed and said speed below said first predetermined speed is below the active thermal atmosphere combustion speed, said control means drives the exhaust path opening adjustment means to open the exhaust path opening to a fully open position from a beginning of the stopping signal when said engine speed is above said active thermal atmosphere combustion speed until said engine speed is below said active thermal atmosphere combustion speed.

11. A combustion control apparatus for a spark ignition type 2-cycle internal combustion engine wherein fresh air mixed with fuel in a combustion chamber can be self-ignited at least in a low load operation region, comprising:

exhaust path opening adjustment means for adjusting the opening of an exhaust path to control the compression starting cylinder pressure;

control means for driving said exhaust path opening adjustment means to an exhaust path opening corresponding at least to a first predetermined engine speed and a predetermined throttle valve opening to control the compression starting cylinder pressure so that fresh air mixed with fuel in said combustion chamber can be self-ignited at an ignition timing sufficient for operation of said internal combustion engine;

upon the development of a stopping signal for said internal combustion engine, when the internal combustion speed is higher than a second predetermined speed above idle, the control means drives said exhaust path opening adjustment means to open said exhaust path to a position where self-ignition is impossible;

the control means controls said exhaust path opening to remain at said position where self-ignition is impossible from said second predetermined speed until the internal combustion engine speed drops below said first predetermined speed; and when the internal combustion speed drops below said first predetermined speed, said control means drives said exhaust path opening ratio adjustment means to close said exhaust path to a position where ordinary combustion is possible.

12. The combustion control apparatus according to claim 11, wherein when the internal combustion engine speed is higher than the second predetermined speed, the control means controls the throttle valve opening to a fully closed position and the exhaust path opening to a fully open position.

13. The combustion control apparatus according to claim 12, wherein when the internal combustion engine speed drops below the first predetermined speed, the control means controls the exhaust path opening to be restricted and the throttle valve opening to be slightly open.

14. The combustion control apparatus according to claim 12, wherein the control means drives the exhaust path opening adjustment means to open the exhaust path opening to a fully open position from a beginning of the stopping signal until said internal combustion engine speed drops below said first predetermined speed.

* * * * *